United States Patent [19]

Suzuki et al.

[11] Patent Number: 5,581,323
[45] Date of Patent: Dec. 3, 1996

[54] OPTICAL APPARATUS FOR CONTROLLING OPERATIONS BASED ON A USER'S VISUAL AXIS

[75] Inventors: Etsuro Suzuki, Yokohama; Hiroshi Matsushima, Machida, both of Japan

[73] Assignee: Canon Kabushiki Kaisha, Tokyo, Japan

[21] Appl. No.: 350,972

[22] Filed: Nov. 29, 1994

[30] Foreign Application Priority Data

Nov. 29, 1993 [JP] Japan ................................. 5-298572
Dec. 1, 1993 [JP] Japan ................................. 5-301736

[51] Int. Cl.⁶ ........................................................ G03B 3/00
[52] U.S. Cl. ............................... 396/51; 396/56; 396/59

[56] References Cited

U.S. PATENT DOCUMENTS

| | | | |
|---|---|---|---|
| 4,937,604 | 6/1990 | Yoshida et al. | 354/266 |
| 5,245,381 | 9/1993 | Takagi et al. | 354/471 |
| 5,333,029 | 7/1994 | Uchiyama et al. | 354/410 |
| 5,381,206 | 1/1995 | Akashi et al. | 354/402 |
| 5,406,348 | 4/1995 | Wheeler | 354/402 |

FOREIGN PATENT DOCUMENTS

| | | | |
|---|---|---|---|
| 63-94232 | 4/1988 | Japan | G03B 7/08 |
| 1274736 | 11/1989 | Japan | A61B 3/10 |
| 3192338 | 8/1991 | Japan | G03B 13/02 |
| 4100026 | 4/1992 | Japan | G03B 13/02 |
| 4112235 | 9/1992 | Japan | G03B 7/26 |

*Primary Examiner*—Michael L. Gellner
*Assistant Examiner*—Eric Nelson
*Attorney, Agent, or Firm*—Fitzpatrick, Cella, Harper & Scinto

[57] ABSTRACT

Optical apparatus for controlling operations based on a user's visual axis includes a finder for observing an object, and circuitry for judging whether or not a user is looking into the finder. First control circuitry is provided for discontinuing a predetermined operation of the apparatus when the judging circuitry judges that the user is not looking into the finder. Second control circuitry is provided for beginning the predetermined operation regardless of the result judged by the judging circuitry. Selection circuitry is provided for selecting one of an operation of the first control circuitry and an operation of the second control circuitry according to an operational state of the apparatus. Preferably, the device is incorporated into a camera in which a self-timer or a remote-control photographing mode may be carried out even if the user's visual axis is not detected in the view finder.

18 Claims, 11 Drawing Sheets

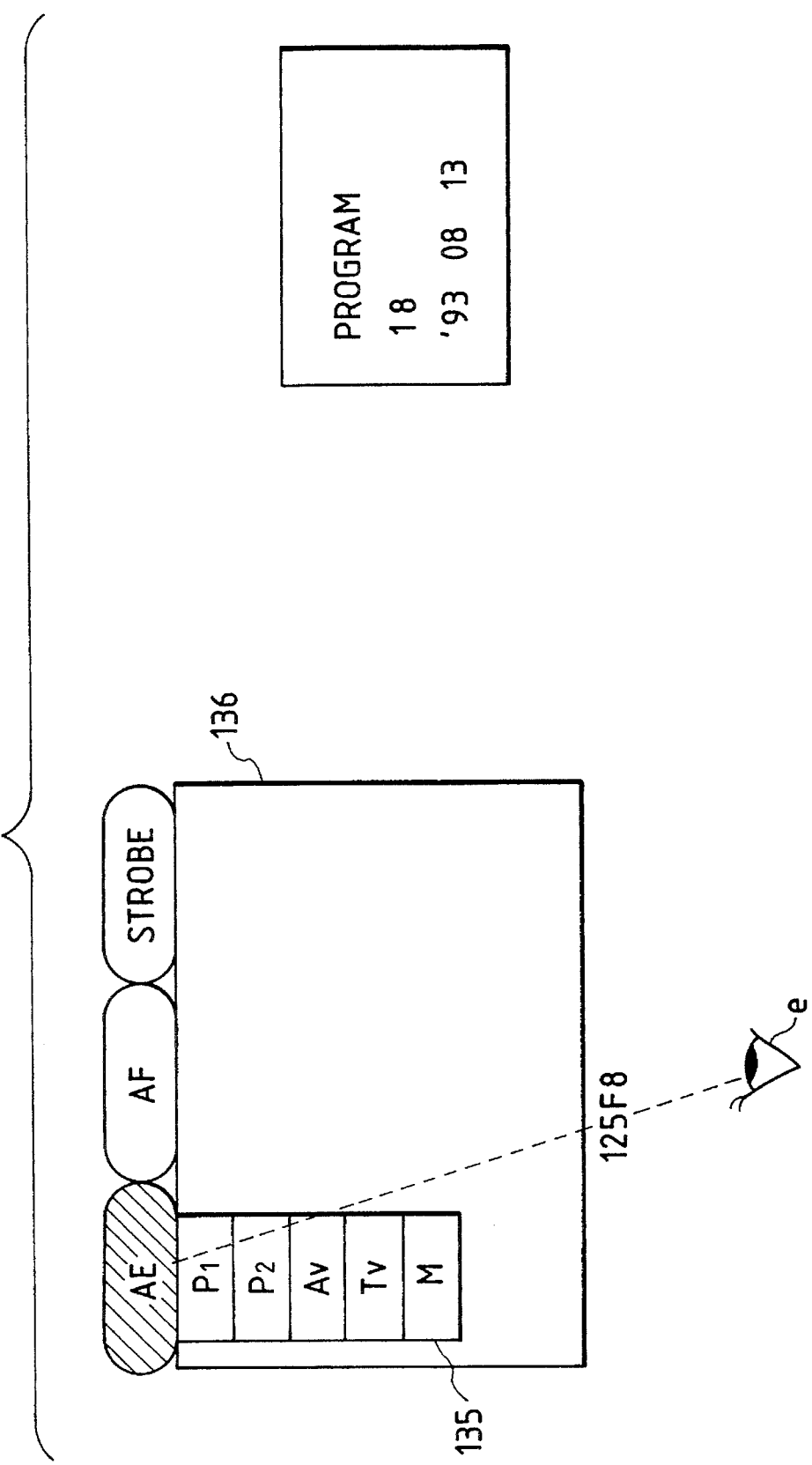

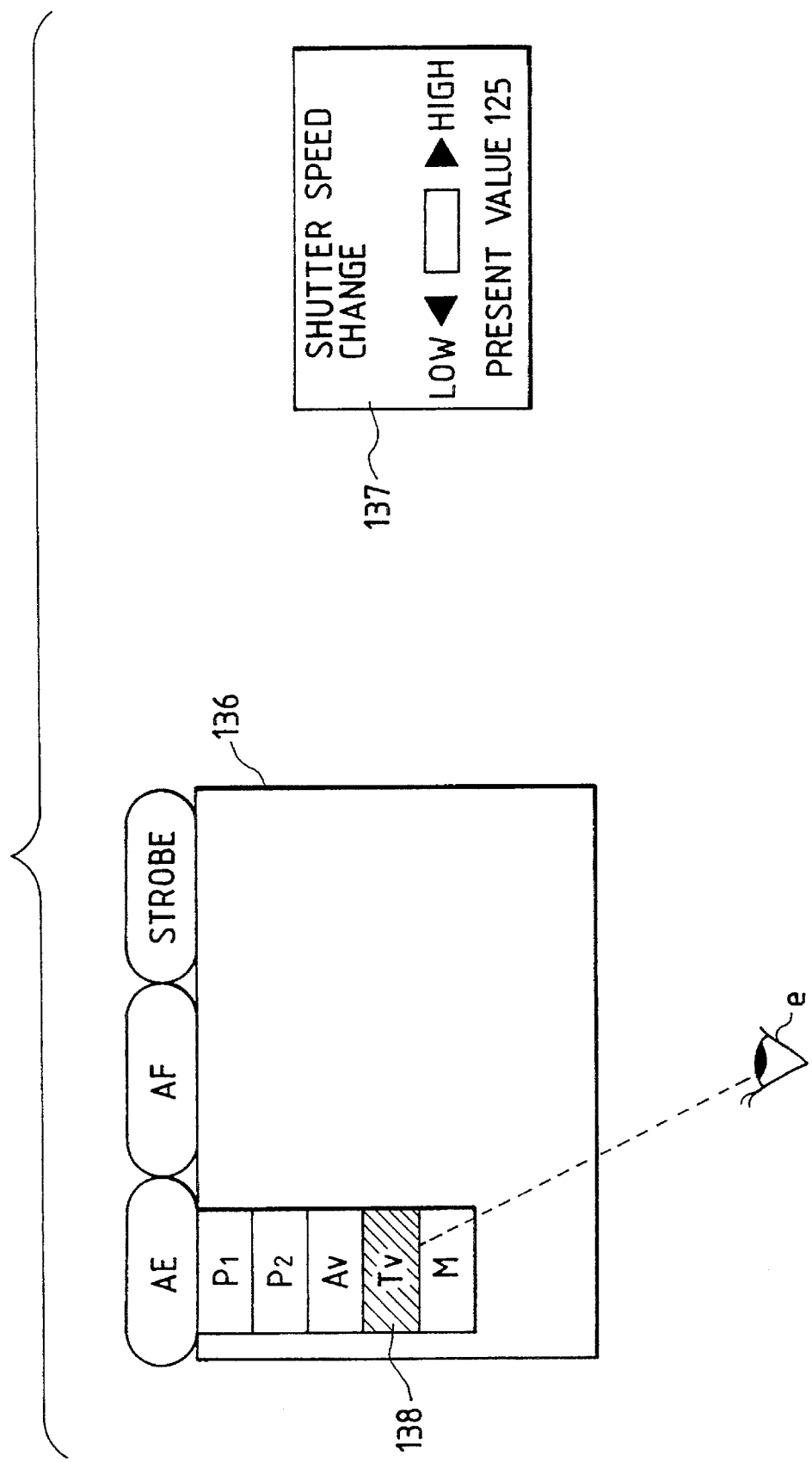

5,581,323

OPTICAL APPARATUS FOR CONTROLLING OPERATIONS BASED ON A USER'S VISUAL AXIS

BACKGROUD OF THE INVENTION

1. Field of the Invention

This invention relates to an optical apparatus such as a silver salt film camera, a video camera, a microscope, or an observation apparatus.

2. Related Backgroud Art

There have heretofore been proposed various apparatuses for detecting an observer's visual axis and effecting control so as to accomplish the observer's will in an observation apparatus such as a camera.

As means for detecting the visual axis, for example, in Japanese Laid-Open Patent Application No. 1-274736, infrared illuminating light is applied to the observer's eye and the gaze point is detected by a reflected image from the cornea or crystalline lens of the eye.

On the other hand, as an example using the above-described visual axis detecting means, there is shown in Japanese Laid-Open Patent Application No. 4-100026 a photographing indicating apparatus including photographing operation indicating means for indicating an photographing operation including at least the starting of photographing. According to this, a predetermined location is seen by the visual axis, whereby shutter release or the like is effected and therefore, there is no necessity of using a hand, and this leads to an advantage of good operability.

Also, in Japanese Laid-Open Patent Application No. 63-94232, there is shown a camera controlling apparatus provided with detecting means for detecting the position of a photographer's visual axis, and judging means for judging the photographer's instructions in the basis of position information from the detecting means. According to this, various kinds of instructions to the camera can be given by the movement of the eyeball and there is no necessity of keeping the eye apart from a finder and there is no any necessity of using a hand, and this leads to an advantage that camera shake does not occur.

Also, Japanese Laid-Open Patent Application No. 3-192338 shows an apparatus in which visual axis detecting means detects that an observer's eye has looked into the eyepiece portion of observation means, to thereby start the operation of a function added to the observing function of the observation means, and detects that the observer's eye is apart from said eyepiece portion, to thereby discontinue the operation of said added function. On the other hand, however, the function of the apparatus is discontinued with the observer's eye kept apart from the eyepiece portion and this leads to the inconvenience that in spite of the observer having the will to discontinue the added function, the apparatus becomes inoperative.

SUMMARY OF THE INVENTION

It is an object of the present invention to enable an apparatus to perform a desired operation even in a state in which an observer has stopped observation.

It is another object of the present invention to cause an apparatus which discontinues its operation when means for judging whether an operator is looking into a finder judges that the operator is not looking into the finder to perform a desired operation even in a state in which the operator is not looking into the finder.

Further objects of the present invention will become apparent from the following detailed description of some embodiments of the invention.

BRIEF DESCRIPTION OF THE DRAWINGS

FIGS. 9A to 9C show the field of view of the finder and an external display surface.

DESCRIPTION OF THE PREFERRED EMBODIMENTS

The first three of embodiments which will hereinafter be described prohibit the function of discontinuing a certain kind of selected function of a camera even if it is judged that a photographer is not looking into a finder when the mode of the camera is (1) the self timer mode, (2) the tripod mounted mode, and (3) the mode in which the camera is standing by to receive a signal from a wireless remote control indicator.

Also, when the visual axis is not detected a particular number of times by the use of visual axis detecting means, it is judged that the photographer is not looking into the finder.

<First Embodiment>

Figure 1:
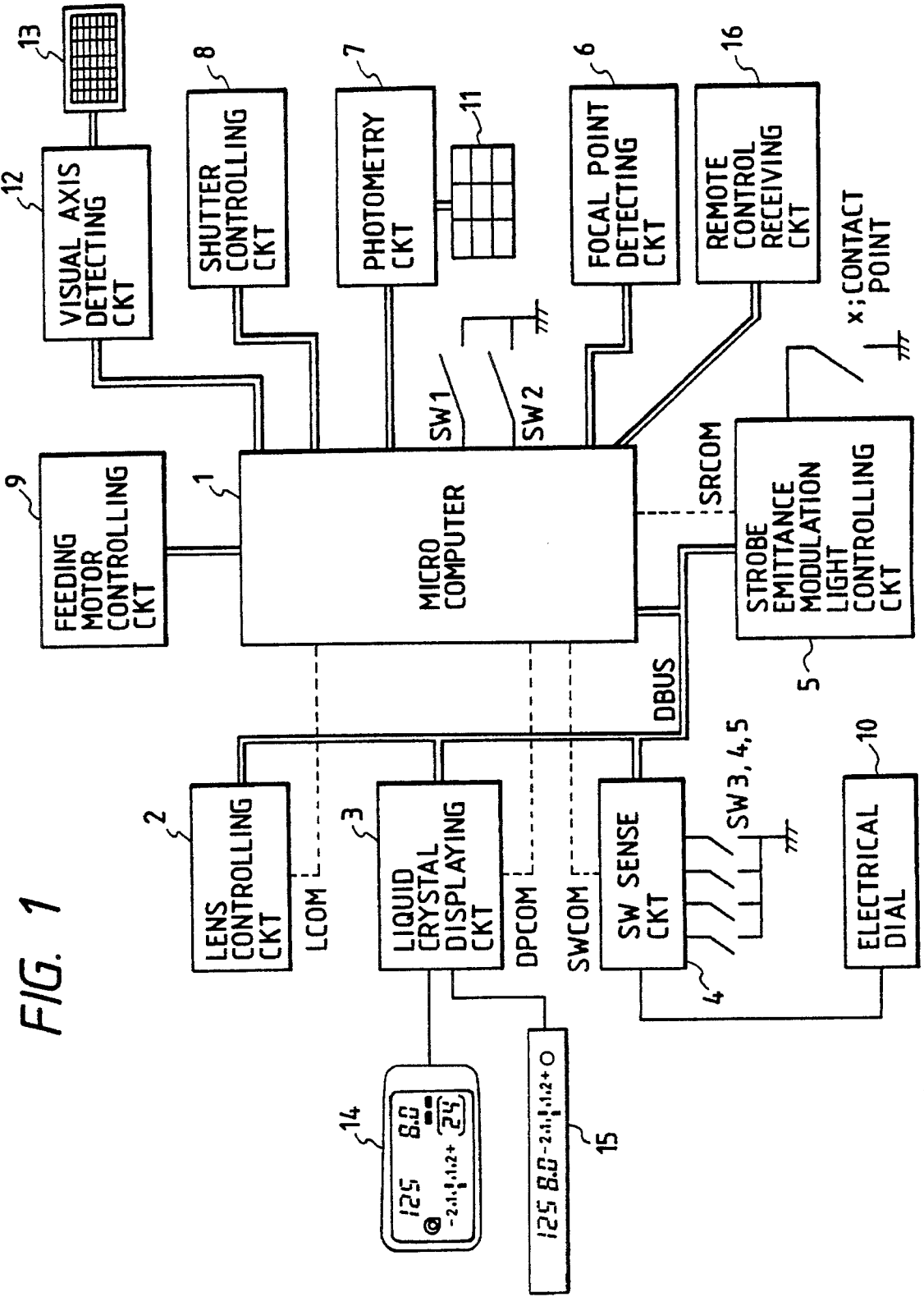
FIG. 1 is an electric block diagram showing a first embodiment of the present invention.

FIG. 1 is a block diagram showing the electrical control of a camera embodying the present invention.

The reference numeral 1 designates a microcomputer for controlling the movement of each portion of the camera.

The reference numeral 2 denotes a lens controlling circuit which drives and controls a motor for adjusting the focus of a photo-taking lens, not shown, and a motor for controlling an aperture blade. The lens controlling circuit 2 effects serial communication through DBUS while it receives LCOM signal from the microcomputer 1. It receives motor drive information by the serial communication and drives and controls the motors by that information. At the same time, it sends various kinds of information (focal length, etc.) of the lens to the microcomputer 1 by the serial communication. Also, it closes a lens barrier by the use of lens barrier opening-closing means, not shown, when a power OFF command for the lens is sent from the microcomputer 1 to it.

The reference numeral 3 designates a liquid crystal displaying circuit which is a circuit for driving liquid crystal displays 14 and 15 for informing a photographer of various kinds of photographing information of a camera, such as shutter speed, aperture value, ISO sensitivity and the number of films. The liquid crystal displaying circuit 3 effects serial communication through DBUS while it receives DPCOM signal from the microcomputer 1. It receives display data by the serial communication and drives the liquid crystal displays 14 and 15 in accordance with the data.

The reference numeral 4 denotes a switch sense circuit which is a circuit for reading the states of a switch for the photographer to set each photographing condition and a switch for showing the state of the camera, and sending the result of the reading to the microcomputer 1. It sends switch data to the microcomputer 1 by serial communication through DBUS while it receives SWCOM signal.

The reference numeral 5 designates a strobe emittance modulation light controlling circuit which is a circuit for controlling the emitrance of a stroboscope and the emittance stopping function by TTL modulation light. The strobe emitrance modulating light controlling circuit 5 effects serial communication with the microcomputer 1 through DBUS while it receives STCOM signal, and receives data regarding strobe control and effects various kinds of control.

The reference numeral 6 denotes a focal point detecting circuit which comprises a line sensor for effecting AF by an existing phase difference detection system, and a circuit unit for reading the accumulation therein. The focal point detecting circuit 6 effects control by the microcomputer 1.

The reference numeral 7 designates a photometry circuit which effects the photometry of an object by a division photometry sensor 11 and sends photometry outputs to the microcomputer 1 by the control of the microcomputer. The microcomputer 1 A/D-converts the plurality of photometry outputs sent thereto, and uses them for the setting of exposure conditions (aperture and shutter speed).

The reference numeral 8 denotes a shutter controlling circuit which controls the movement of the forward curtain and rearward curtain of a shutter, not shown, in accordance with the control signal of the microcomputer 1.

The reference numeral 9 designates a feeding motor controlling circuit which effects the feeding (winding up and rewinding) of film in accordance with the control signal from the microcomputer 1.

SW1 denotes a button for starting the operation of the camera. When the microcomputer 1 recognizes that the button SW1 has been depressed, it starts photometry, distance measurement and display. SW2 is operatively associated with the release button of the camera, and when the microcomputer 1 recognizes that SW2 has been depressed, it starts the exposure operation. X contact point becomes ON at the timing of completion of the movement of the forward curtain of the shutter and serves to inform the strobe emittance modulation light controlling circuit 5 of the timing of strobe emitrance. SW3 designates a switch for setting the self timer mode, and when the release switch SW2 is closed in a state in which a self-timer set by the switch SW3 the self-timer operates. SW4 denotes a switch adapted to be closed when a tripod is mounted on the camera, and SW5 designates a switch for setting the camera to a wireless remote control receiving state, and when it receives a signal from the remote controller in its set state, it starts the release operation.

The reference numeral 10 denotes an electrical dial for changing TV value, AV value, modes, etc. When for example, the electrical dial is rotated while a mode switching button is depressed, the mode is changed in the fashion of shutter speed (TV) priority→aperture value (AV) priority→manual→program→TV priority→AV priority→manual→program→. . . , and the camera can be set to a mode intended by the photographer. Also, when the electrical dial 10 is rotated in the opposite direction, the mode is changed in the fashion of program→manual→AV priority→TV priority→program→. . . Also, when TV priority is set as the mode by the mode changing switch and the electrical dial, a TV value desired by the photographer can be set by rotating the electrical dial 10. When AV priority is set as the mode by the mode changing switch and the electrical dial, an AV value desired by the photographer can be set by rotating the electrical dial 10.

The reference numeral 11 designates a division photometry sensor and the reference numeral 12 denotes a visual axis detecting circuit which drives a CCD 13 for receiving the image of an eye and an IRED for generating P image (Purkinje's image), not shown, and transfers an output to the microcomputer 1. In response to this output, the microcomputer 1 A/D-converts an input value and detects, on the basis of a conventional visual axis detecting technique, what part in the finder the photographer's eye is looking at. Also the fact that the visual axis has been detected means that it can be judged that the photographer's eye is looking into the finder.

The reference numeral 13 denotes a CCD for detecting the visual axis, the reference numeral 14 designates a liquid crystal display for external display located on the body of the camera, and the reference numeral 15 denotes a liquid crystal display for display in the finder.

The reference numeral 16 designates a remote control receiving circuit which, when it receives a particular signal from a remote controller, not shown, informs the microcomputer 1 of it, and the microcomputer 1 starts the release operation by that signal.

Figure 2:
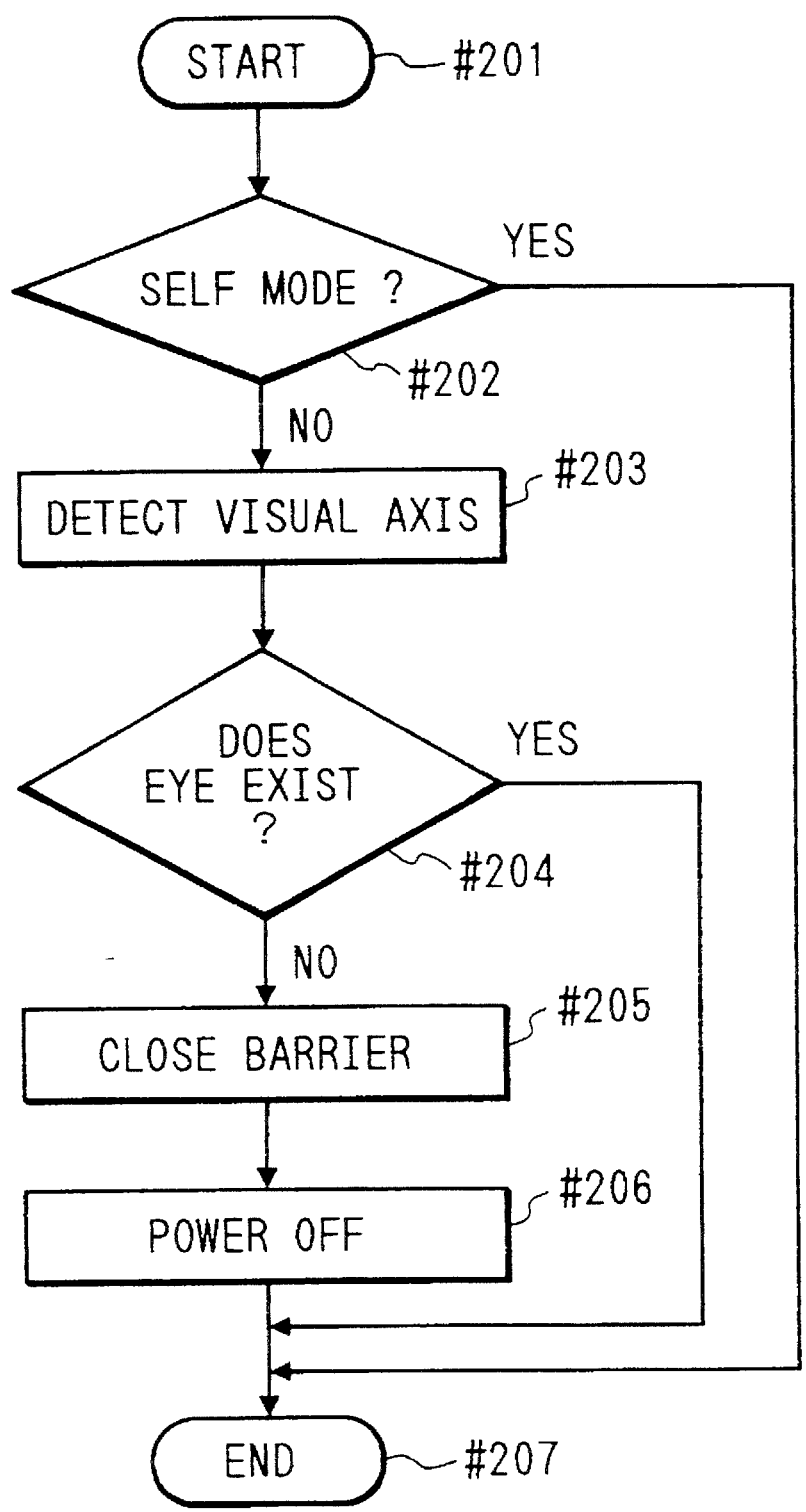
FIG. 2 is a flow chart showing the operation of the first embodiment.

The present embodiment will now be described by the use of FIG. 2.

(#201): Start.
(#202): Here, whether the camera is set to the self timer mode by the switch SW3 is judged, and during the self timer mode, whether the photographer is looking into the finder is checked, and if the self timer mode is set, it is judged that the photographer is not looking into the finder, and the sequence of closing the lens barrier and automatically switching off the power source is skipped and advance is made to (#207). (#203): Here, visual axis detection is effected. If visual axis detection could be effected here, it is judged that the photographer is looking into the finder, and if the visual axis could not be detected, it is judged that the photographer is not looking into the finder. (#204): Here, as a result of the detection at (#203), whether the photographer is looking into the finder is judged. As regards this judgement, if at (#203), it has been judged several times that the photographer is not looking into the finder, then it is more certain that the photographer is not looking into the finder. (#205): Here, communication is effected with the lens and the barrier of the lens is closed. (#206): Setting for switching off the power source of the camera is effected. (#207): End.

As described above, in a camera wherein the power source of the camera is switched off by the visual axis detecting means, self-timer photographing is made possible and the power source can be prevented from being unnecessarily switched off.

<Second Embodiment>

In the first embodiment, in the state in which the self timer mode is set, the sequence of the power source being automatically switched off by the detection of the visual axis is prevented from being executed, while in this embodiment, the design is made such that the sequence of the power source being automatically switched off is prohibited during the mounting of a tripod.

Figure 3:
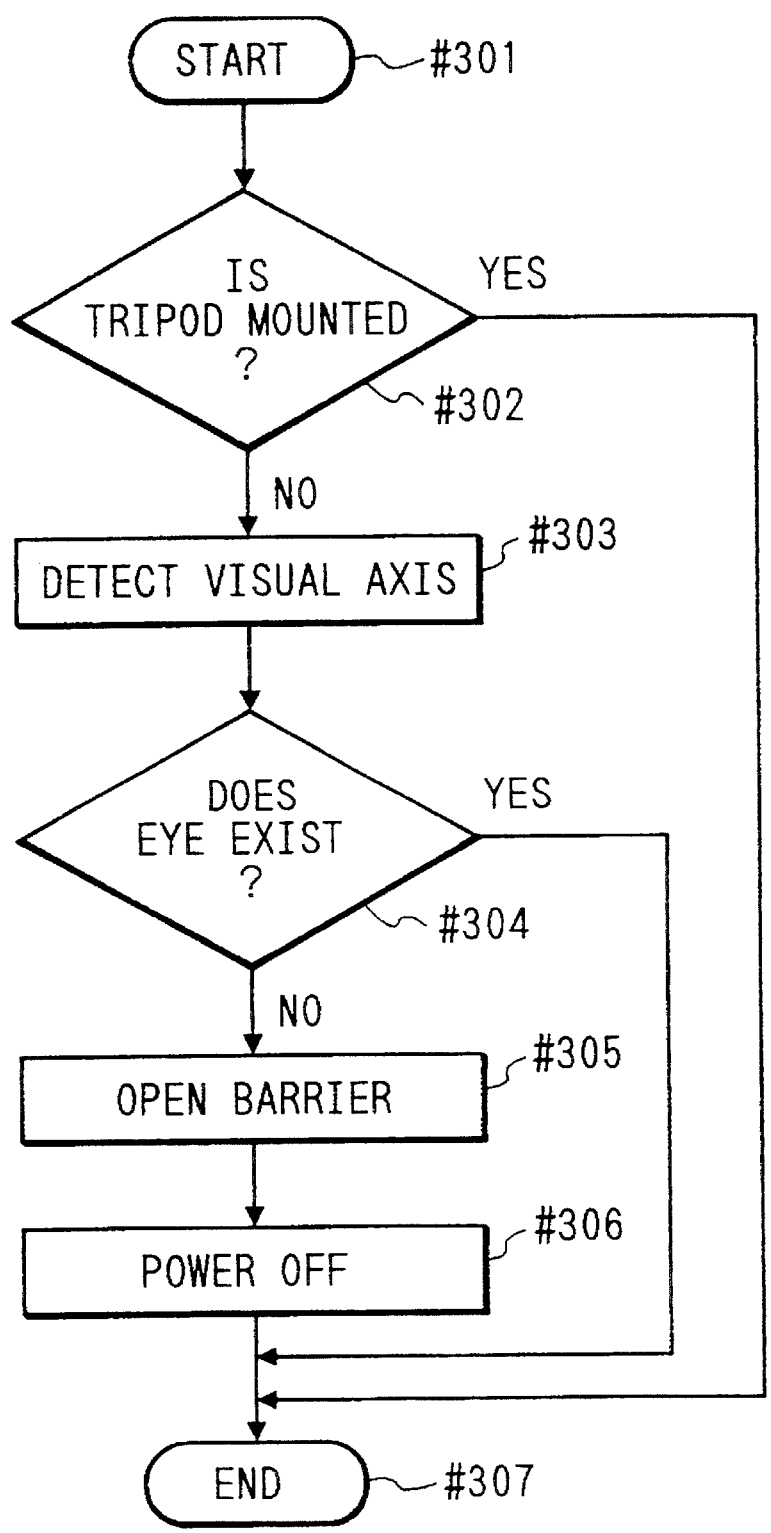
FIG. 3 is a flow chart showing the operation of a second embodiment of the present invention.

The present embodiment will hereinafter be described by the use of FIG. 3.

Step (#301) is similar to the step (#201) of FIG. 2, and steps (#303) to (#307) are similar to the steps (#203) to (#207) of FIG. 2, and the description of the operations thereof is omitted and a different step (#302) will herein after be described. (#302): Here, whether a tripod is mounted on the camera is detected by the switch SW4 attached to the tripod. If, it is judged that the tripod is mounted, an advance is made to the sequence of the power source being automatically switched off by visual axis detection (the detection of the existence of the eye), and if it is judged that the tripod is not mounted, the sequence of the power source being automatically switched off by the detection of the existence of the eye is prohibited.

By the use of the present embodiment described above, it does not happen that the power source is automatically switched off during tripod photographing in which photographing is often effected with the eye kept apart from the finder, and the feeling of use is more enhanced.

<Third Embodiment>

This embodiment is one in which when a wireless remote control release signal or the like is being waited for, the sequence of the power source being automatically switched off by the detection of the existence of the eye in front of the finder is prohibited.

Figure 4:
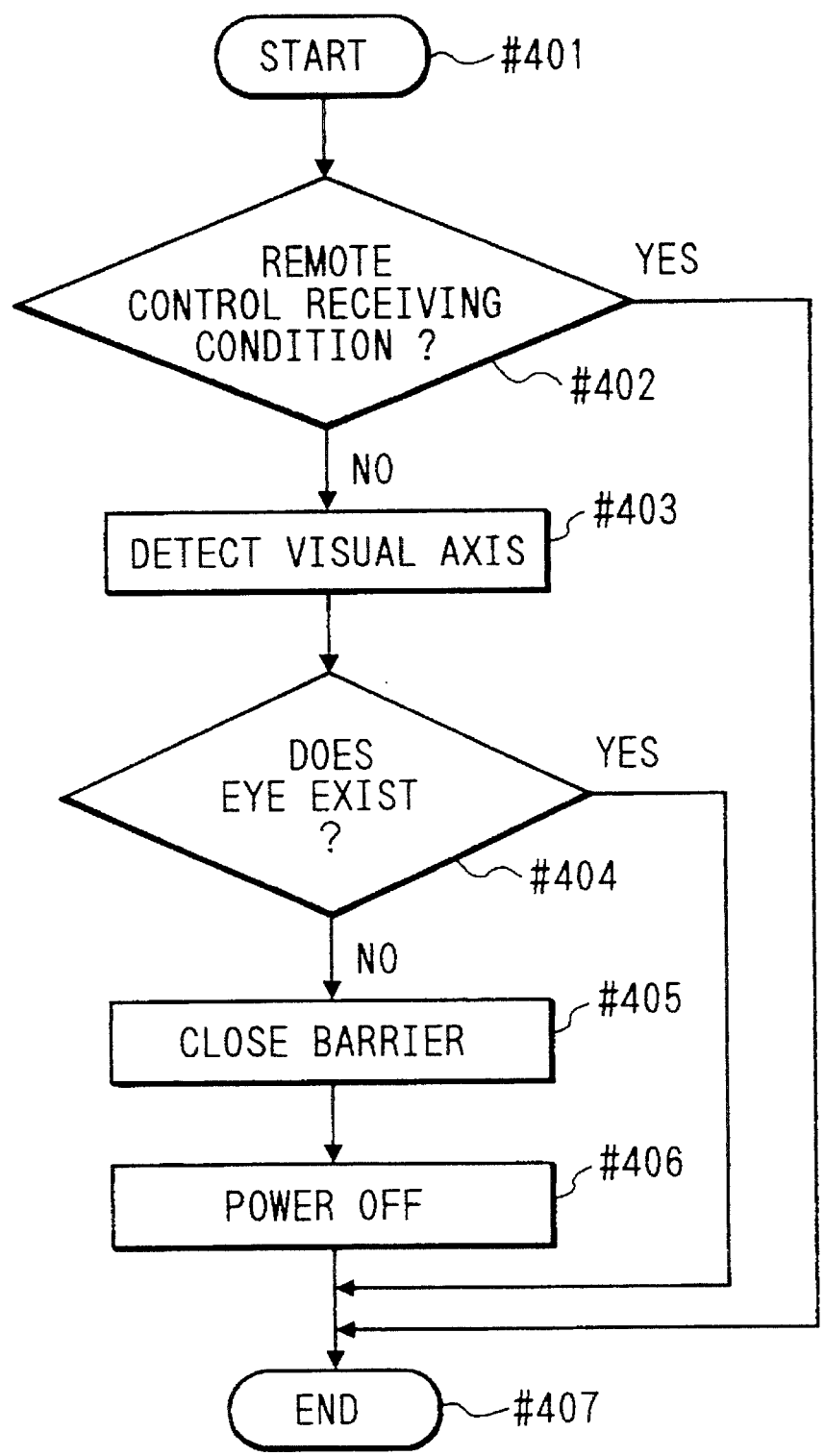
FIG. 4 is a flow chart showing the operation of a third embodiment of the present invention.

The present embodiment will hereinafter be described by the use of FIG. 4.

Step (#401) is similar to the step (#201) of FIG. 2 and steps (#403) to (#407) are similar to the steps (#203) to (#207) of FIG. 2 and therefore, the description of these steps is omitted and a different step (#402) will hereinafter be described. (#402): Here, whether the camera is set to a wireless remote control waiting state by the switch SW5 is judged. If, the camera is not set to the remote control waiting state, an advance is made to the sequence of the power source being automatically switched off by the detection of the existence of the eye, and if the remote control is set to the waiting state by the switch SW5, the sequence of the power source being automatically switched off by the detection of the existence of the eye is prohibited.

By the use of the present embodiment described above, it does not happen that the power source is inadvertently switched off during photographing in which instructions are given to the camera by the use of wireless remote control premised on the fact that photographing is effected with the eye kept apart from the finder, and the feeling of use is improved.

Each of the above-described embodiments is also applicable to an eyepiece shutter, besides the lens barrier.

As described above, according to the present embodiment, it does not happen that simply by the photographer, for example, in advertently keeping his or her eye apart from the finder, the operation of the camera is discontinued, for example, the main power source is switched off, in a particular state in which the camera is set, for example, to the self timer mode, and photographing can be executed even when photographing is often effected with the eye kept apart from the finder as in the self timer mode, the remote control mode or in the tripod using state.

The next embodiment, (when, for example, it is desired to operate the self-timer), makes unnecessary a mechanical operation such as the switching operation of the photographer operating the self-timer, because the operation of the self-timer mode is automatically started when the photographer spaces his or her eye apart from the camera in order to move to a photographing place after he or she gazes at the operation-indicating portion of the self-timer.

Figure 5:
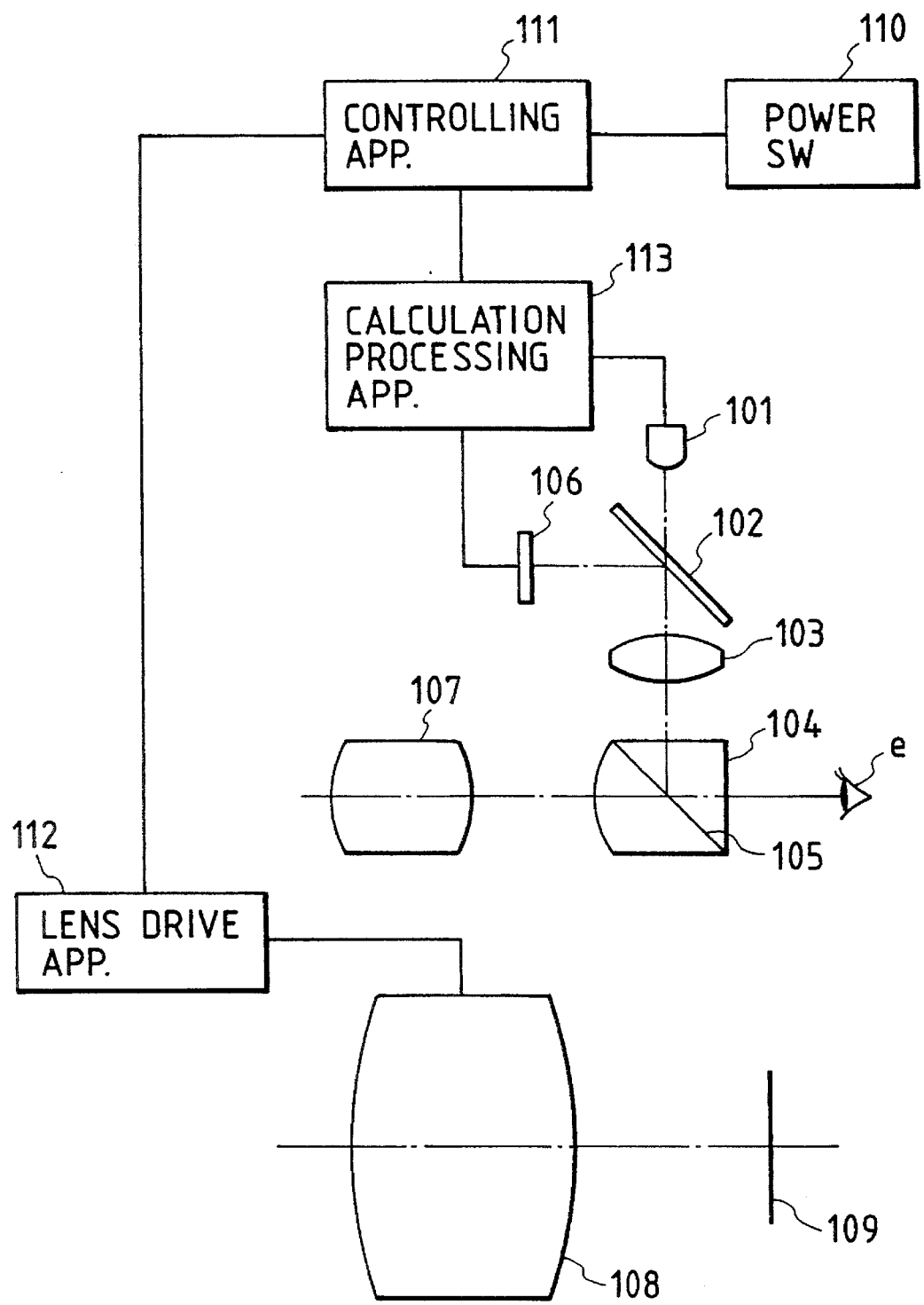
FIG. 5 is a block diagram showing the construction of a fourth embodiment of the present invention.

FIG. 5 shows the construction of a fourth embodiment applied to a camera which is an observation apparatus.

In FIG. 5, the reference numeral 101 designates a light emitting element which is an infrared light emitting diode having a light emission spectrum to which the observer is insensitive, the reference numeral 102 denotes a half mirror for infrared light, the reference numeral 103 designates a lens, the reference numeral 104 denotes an eyepiece, the reference numeral 105 designates a dichroic mirror reflecting infrared light and transmitting visible light therethrough, the reference numeral 106 denotes a light receiving element such as an area sensor, the reference numeral 107 designates a finder optical system, the reference numeral 108 denotes a photo-taking lens, the reference numeral 109 designates film or a solid state image pickup element, the reference numeral 110 denotes a power source switch, the reference numeral 111 designates a controlling apparatus for controlling the entire camera, the reference numeral 112 denotes a lens drive apparatus, and the reference numeral 113 designates a calculation processing apparatus. These are the portions forming the kernel of the present embodiment.

Figure 6:
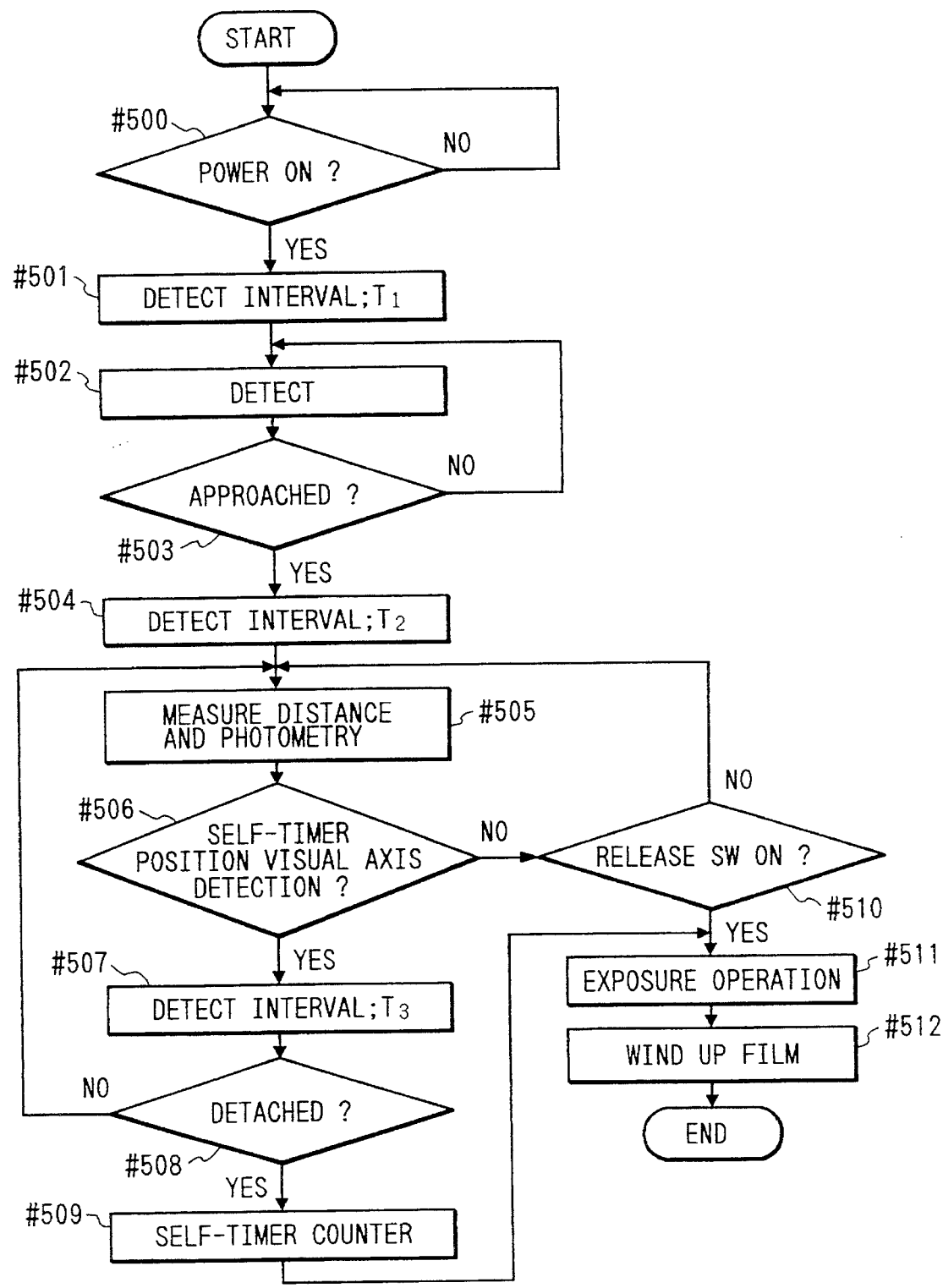
FIG. 6 is a flow chart showing the operation of the fourth embodiment.

FIG. 6 is a flow chart illustrating the operation of the present embodiment. When in an attempt to effect photographing, the photographer closes the power source switch 110 of the camera which is an observation apparatus, the controlling apparatus 111 starts its operation in response thereto, and sends a signal for visual axis detection (which will be described just below) after the lapse of a time interval $T_1$ for the starting of visual axis detection (#500 to #501). The calculation processing apparatus 113 which has received the signal turns on the light emitting element 101. The infrared light emitted from the light emitting element 101 passes through the half mirror 102, the lens 103, the eyepiece 104 and the dichroic mirror 105 and illuminates the vicinity of the photographer's eye point e indicated by the picture of an eye in FIG. 5. When the photographer is not levelling the camera, the reflected light from the photographer's eyeball is not present and therefore, no image signal appears in the light receiving element 106. In response to this result, the calculation processing apparatus 113 detects that the photographer's eye is not close to the finder.

The apparatus comprised chiefly of the light emitting element 101, the half mirror 102, the lens 103, the eyepiece 104, the dichroic mirror 105, the light receiving element 106 and the calculation processing apparatus 113 is a visual axis detecting apparatus and will hereinafter be referred to as such.

On the other hand, in a state in which the photographer looks into the finder, the infrared light emitted from the light emitting element 101 is reflected by the eyeball and again enters the eyepiece 4, whereafter it passes through the dichroic mirror 105, the lens 103 and the half mirror 102 and is imaged on the light receiving element 106. It is FIG. 7 that shows one line signal outputted at this time from the light receiving element 106 comprised of the area sensor 101.

Figure 7:
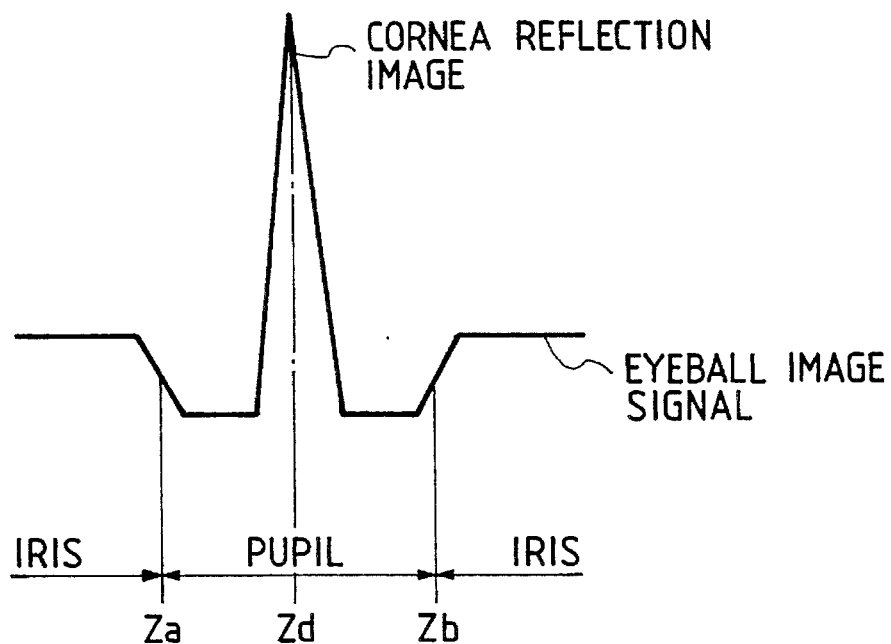
FIG. 7 shows the output signal of a light receiving element.

In FIG. 7, what is indicated by solid line is an image signal, and the manner in which the reflection images of the pupil, the iris, the cornea, etc. are formed in comformity with the difference in the reflecting surface and reflectance can be seen from this figure. The calculation processing apparatus 113 recognizes the presence of the cornea reflection image and the pupil from this image signal and detects that the photographer's eye is approaching the finder (#503). The calculation processing apparatus 113 delivers aproach signal of the eye to the controlling apparatus 111 when it detects the approach of the photographer's eye. In response to this signal, the controlling apparatus 111 re-sets the time interval for detecting the approach of the eye to $T_2$ ($T_2$>$T_1$) (#504). The controlling apparatus 111 then measures the distance to the object and the brightness of the object by the use of distance measuring means and photometry means, not shown (#505). Thus, the photographer can start each operation for photographing without any cumbersome operation.

In the present embodiment, the photographer's visual axis can be detected by the aforedescribed visual axis detecting apparatus and the detection of the visual axis of the photographer looking into the finder is effected by detecting the reflected light of the eyeball illuminated with the infrared light emitted from the light emitting element 101. Assuming, for example, that the image signal as shown in FIG. 7 has been obtained by the light receiving element 106, the calculation processing apparatus 113 detects the boundary coordinates Za, Zb of the pupil and the iris and the coordinates Zd of the cornea reflection image, and effects the calculation processing of:

$$\beta \times OC \times \sin\theta \cong \{(Z_d + Z_b)/2\} - Z_d \quad (1)$$

and can thereby detect the photographer's visual axis. Here, $\beta$ is the lateral magnification of the light receiving optical system, OC is the distance from the center of curvature of the cornea to the center of the pupil, $\theta$ is the angle of rotation of the optical axis of the eyeball and the visual axis of the eyeball deviates by about 5 to 7 degree toward the nose relative thereto.

Figure 8:
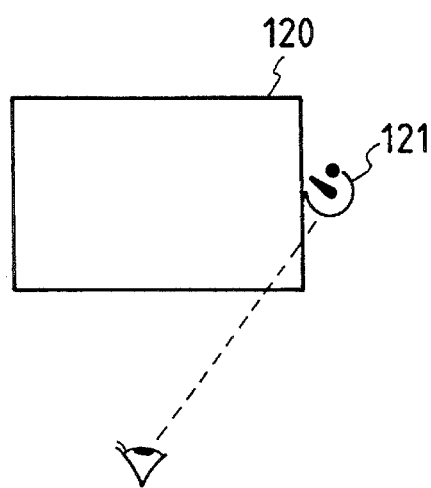
FIG. 8 shows the field of view of a finder.

Now, when the photographer turns his or her visual axis to the display 121 of the self-timer (the broken line leading from the picture of the eye of FIG. 8) which is outside a finder frame 120 shown in FIG. 8 after he or she has decided the composition of the camera, the calculation processing apparatus 113 effects the aforedescribed visual axis detection, detects that the photographer is looking at the symbol display 121 of the self-timer and delivers the signal to the controlling apparatus 111 (#506). In response to this signal, the controlling apparatus 111 re-sets the time interval for detecting the approach of the eye to $T_3$($T_2$>$T_1$>$T_3$) (#507).

Thereafter, the controlling apparatus 111 turns on and off (not shown) the display 121 of the self-timer to indicate to the photographer that the self-timer is preparing for its operation. In this state, the photographer confirms the composition and that the self-timer is preparing for its operation, where after the photographer leaves the camera in order that he or she may also be photographed as an object. Thereupon, the photographer's eye also becomes absent from the camera and therefore, the reflected light from the photographer's eyeball also becomes absent and no image signal appears on the light receiving elemlent 106. The calculation processing apparatus 113 receives this result and detects that the photographer's eye has left the finder (#508). When the calculation processing apparatus delivers this signal to the controlling apparatus 111, the controlling apparatus 111 causes the self-timer to start counting.

The aforementioned time interval for detecting the approach of the eye has been set to $T_3$<$T_1$<$T_2$ because it is usual for the photographer to leave the camera a relatively short time after he or she has looked at the display of the self-timer using his or her visual axis. The camera which has started the counting by the self-timer drives the photo-taking lens 108 by the lens drive apparatus 112 after a time lag of about 10 sec. as is well known, and performs a series of exposure operations such as the opening and closing of a shutter (not shown) and if necessary the light emission of the stroboscopic lamp (#511). When the exposure operations are completed, the film is wound up to the next photographing frame by the controlling apparatus 111 to thereby complete a series of operations (#512). When the ordinary release by the release button is to be effected without the self-timer being operated, the operation of the camera is the same as that of the conventional camera (#510 to #512).

FIGS. 9A, 9B and 9C and FIG. 10 show a fifth embodiment of the present invention. Portions functionally similar to those in the fourth embodiment are given the same reference characters and need not be described.

This fifth embodiment is one in which the operability of a complicated camera of multiple functions has been improved.

Figure 9A:
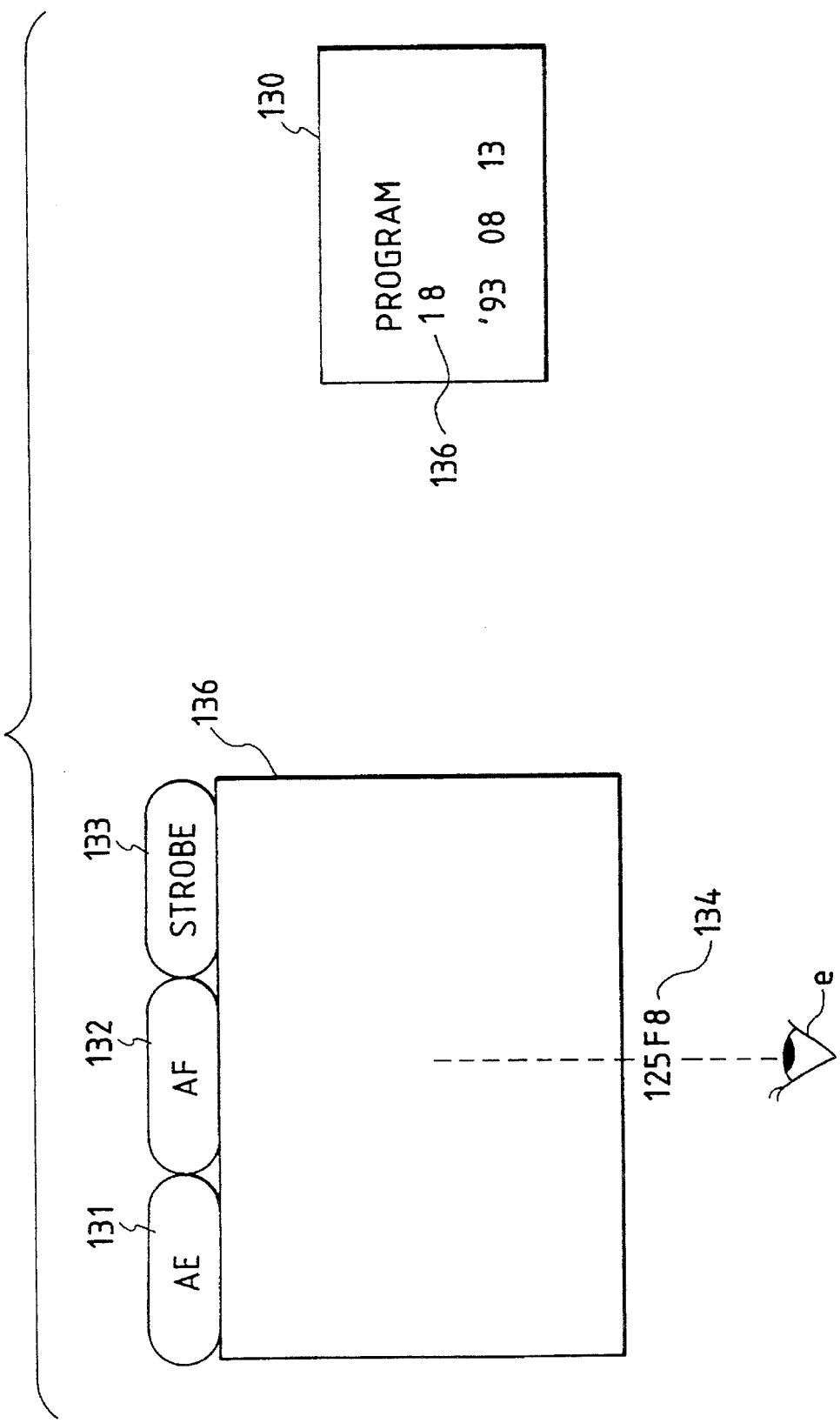

The basic construction of this embodiment is the same as that of the fourth embodiment shown in FIG. 5 and need not be described here, but it is provided with a controling apparatus 111, an external display 130 utilizing a liquid crystal plate or the like, and internal displays 131 to 135 utilizing a transmission type liquid crystal plate or the like capable of effecting superimpose-display within the finder (FIGS. 9A, 9B and 9C).

The operation of the fifth embodiment will now be described with reference to FIGS. 9A, 9B and 9C. The external display 130 is comprised of a dot matrix type liquid crystal plate or the like and can freely display numerals and characters. The state of FIG. 9A is a state in which the observer looks into a finder 136, and the broken line leading from the eye e in the figure represents the observers's visual axis.

During ordinary photographing, the display 136 on the external display 130 displays only information that is very basic. In the fifth embodiment, only the mode of the program, the number of the frame of the film and the current date are displayed, but these are not restrictive.

On the other hand, the observer can see three marks 131–133 provided outside the upper field frame of the finder 136 and the exposure value 134 of the current program. When the observer depresses a release button in this state, the exposure operation will be performed. Consider now a case where in a certain photographing state, the observer attempts to change the shutter speed. At this time, the observer, as shown in FIG. 9B, gazes at the mark 131 of the AE display using his or her visual axis in order to change the item regarding exposure from among the marks in the upper portion of the finder 136.

The marks within the finder also have an AF mark 132 regarding the automatic focusing function and a character 133 "STROBE" regarding the use of the strobe, and in that case, the observer gazes at the mark corresponding thereto, but since the substances of these operations are the same, a description will be given with respect to the aforementioned AE mark 131. When the observer gazes at the AE mark 131, the visual axis detecting apparatus (comprised chiefly of a light emitting element 101, a half mirror 102, a lens 103, an eyepiece 104, a dichroic mirror 105, a light receiving element 106 and a calculation processing apparatus 113 as in the aforedescribed first embodiment) effects visual axis detection and detects that the observer is looking at the AE mark 131, and delivers the signal to the controlling apparatus 111.

When it receives the signal, the controlling apparatus 111 drives the liquid crystal plate 135 to superimpose the display to thereby display the signal within the finder 136. Thereby, a sub-menu 135 is displayed below the AE mark 131 regarding exposure. In the case of the fifth embodiment, there are five symbols used in total, i.e., $P_1$ and $P_2$ (which are two kinds of program AE modes), AV which is aperture priority AE, $T_V$ which is shutter speed priority AE, and manual M, but these are not restrictive. Then, as shown in FIG. 9C, in this state, the observer further chooses a favorite sub-mode from these and gazes at it using his or her visual axis. Hereupon, the aforedescribed visual axis detecting apparatus effects visual axis detection again and detects that the observer is looking at the position of a sub-menu $T_V$ 138, and delivers the signal to the controlling apparatus 111.

In this state, the observer stops looking into the finder to change the shutter speed and looks at the external display 130 of the camera. Thereupon the observer's eye also leaves the camera and become absent from the camera and therefore, in the visual axis detecting apparatus, the reflected light from the observer's eyeball becomes absent and no image signal appears in the light receiving element 106. The calculation processing apparatus 113 receives this result and detects that the observer's eye has left the finder of the camera.

When the calculation processing apparatus 113 delivers this signal to the controlling apparatus 111, the controlling apparatus 111 changes the display portion 136 of the external display 130 to guide display 137 for changing the shutter speed, as shown in FIG. 9C.

Thus, when the observer keeps his or her eye apart from the finder and looks at the external display of the camera after he or she has indicated a function to be performed while looking into the finder, that function is displayed and therefor, the operability of the camera is very good. Also, the selected function is displayed only when it is necessary to look at it by the external display and thus, ordinary display can be accomplished simply and the amount of information for display of that function can be made great and it becomes possible to guide more comprehensibly to the observer.

Figure 10:
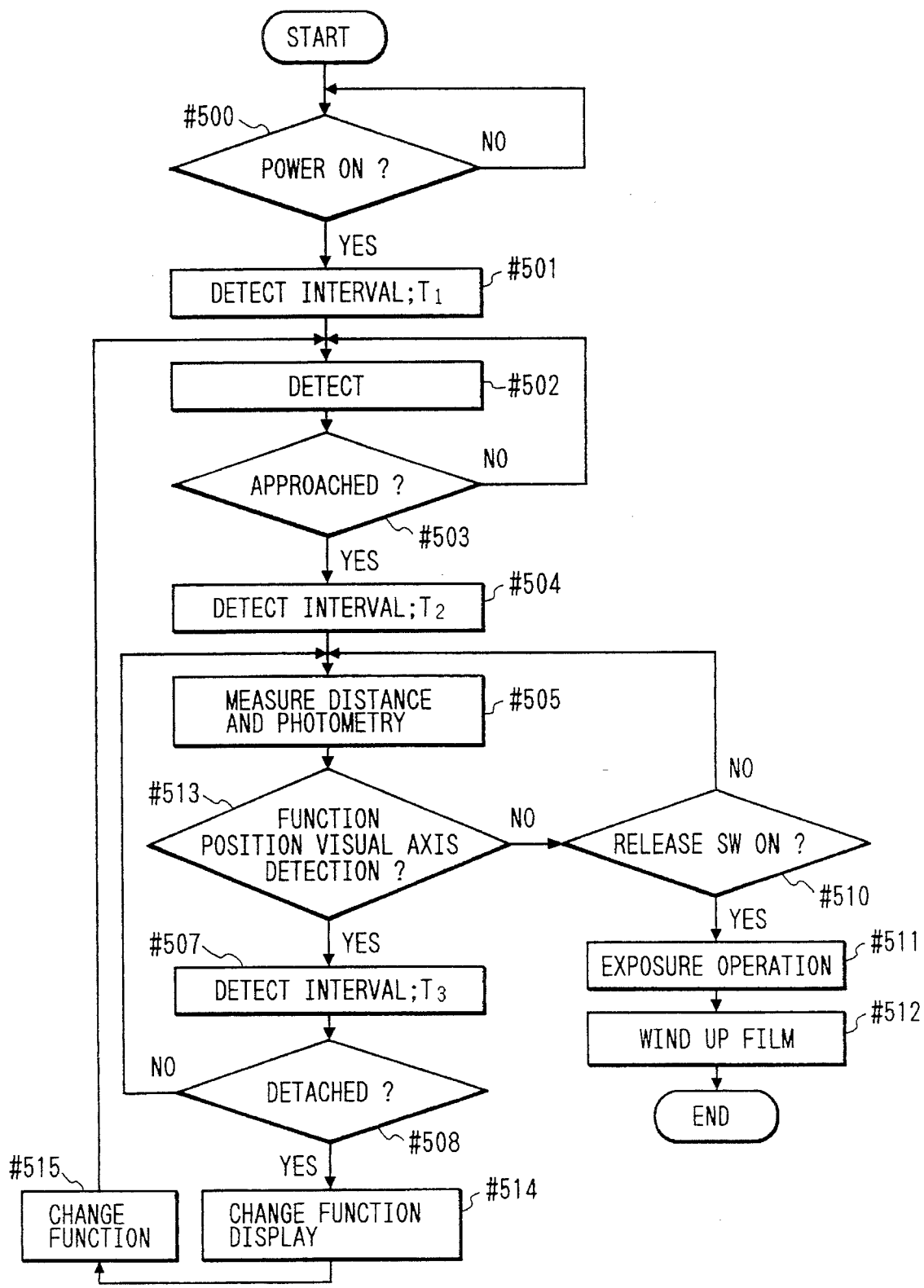
FIG. 10 is a flow chart showing the operation of a fifth embodiment of the present invention.

FIG. 10 is a flow chart showing the operation of the fifth embodiment of the present invention. The same steps as those in the flow chart of the fourth embodiment are given the same numerals and need not be described.

The same operations are performed at #500 to #505, and after distance measurement and photometry, at #513, the visual axis detecting apparatus detects whether the observer is looking at the marks 131–133 within the finder. When the visual axis detecting apparatus detects that the observer's eye has left the camera after it has been detected that the observer has looked at any one of the marks 131–133, the controlling apparatus 111 changes the display portion 136 of the external display 130 to the guide display 137 for that function (#514). Thereafter, the observer changes that function in accordance with the guide display 137 (#515), whereupon the sequence of the camera returns to #502 for detecting the approach of the observer's eye.

As described above, according to the fourth and fifth embodiments, after the observer selects a predetermined function while looking into the observation apparatus, the observer's eye leaves the observation apparatus, whereby it becomes possible to perform the function without touching the observation apparatus. Thus, by the inputting of information by by visual axis and the starting to perform the function being selected, it becomes possible to ensure the inputting of information by the visual axis to be always effected without the observer being flurried, and this leads to the effect that the reliability of the inputting of information is greatly enhanced, and the start of a function to be performed is automatically effected in the natural act of keeping the eye apart from the camera, and this leads to the effect that operability is very good.

What is claimed is:
1. An apparatus provided with:
observation means for observing an object;
judging means for judging whether or not a user is looking into said observation means;
first control means for discontinuing a predetermined operation of said apparatus when said judgment means judges that the user is not looking into said observation means;
second control means for proceeding with the predetermined operation regardless of a result judged by said judging means; and
selection means for selecting one of an operation by said first control means and an operation by said second control means according to an operational state of said apparatus.
2. The apparatus of claim 1 wherein said operational state includes a state in which a self-timer mode is set.
3. The apparatus of claim 1 wherein said operational state includes a state in which a tripod has been mounted on the apparatus.
4. The apparatus of claim 1 wherein said operational state includes a state in which said apparatus is waiting for a wireless remote control signal.
5. The apparatus of claim 1 wherein said judging means has visual axis detecting means for detecting the user's visual axis.
6. The apparatus of claim 5 wherein said judging means judges that the user is not looking into said observation means when a detection result is not obtained after said visual axis detecting means performs its detecting operation a predetermined number of times.
7. The apparatus of claim 1 wherein said first control means stops the predetermined operation by switching off a predetermined power supply.
8. An apparatus provided with:
observation means for observing an object;
detecting means for detecting a user's gazing position;
judgment means for judging whether or not said user is looking into said observation means;
a display portion for displaying a character which corresponds to a predetermined operation to be performed by said apparatus; and
means for causing said apparatus to start the predetermined operation in a case where said detecting means detects that said user has gazed at said display portion and thereafter said judging means judges that said user is not looking into said observation means.
9. The apparatus of claim 8 wherein it is detected by said detecting means that the user's eye has left said observation means.
10. The apparatus of claim 8 wherein said display portion displays a plurality of characters respectively corresponding to operations which said apparatus can perform.
11. The apparatus of claim 8 wherein said display portion is disposed in the observation field of said observation means.
12. A camera comprising:
a finder for observing an object;
judgment means for judging whether or not a user is looking into said finder;
setting means for setting a self-timer mode;
first control means for discontinuing a predetermined operation of said camera when said judgment means judges that said user is not looking into said finder;

second control means for proceeding with said predetermined operation regardless of a result judged by said judgment means; and selection means for selecting said second control means in a case where said self-timer mode is set by said setting means, and for selecting said first control means in a case where said self-timer mode is not set by said setting means.

13. A camera according to claim 12, wherein said first control means stops said predetermined operation by switching off a predetermined power supply.

14. A camera comprising:

a finder for observing an object;

judgment means for judging whether or not a user is looking into said finder;

setting means for setting a remote-control mode activated by a remote controller;

first control means for discontinuing a predetermined operation of said camera when said judgment means judges that said user is not looking into said finder;

second control means for proceeding with said predetermined operation regardless of a result judged by said judgment means; and selection means for selecting an operation by said second control means in a case where said remote-control mode is set by said setting means, and for selecting an operation by said first control means in a case where said remote-control mode is not set by said setting means.

15. A camera according to claim 14, wherein said first control means stops said predetermined operation by switching on a predetermined power supply.

16. A camera comprising:

a finder for observing an object;

judging means for judging whether or not a user is looking into said finder;

tripod detecting means for detecting whether or not a camera is coupled to a tripod;

first control means for discontinuing a predetermined operation of said camera when said judging means judges that said user is not looking into said finder;

second control means for proceeding with said predetermined operation regardless of a result judged by said judging means; and selection means for selecting an operation by said second control means in a case where it is judged by said tripod detecting means that said camera is coupled to a tripod, and for selecting an operation by said first control means in a case where it is judged by said tripod detecting means that said camera is not coupled to the tripod.

17. A camera according to claim 16, wherein said first control means stops said predetermined operation by switching off a predetermined power supply.

18. An apparatus provided with:

observation means for observing an object;

detecting means for detecting a user's gazing position;

a display portion for displaying a character which corresponds to a predetermined operation to be performed by said apparatus;

selecting means for selecting said predetermined operation in a case where said user's gazing position detected by said detecting means corresponds to said display portion; and regulating means for preventing the start of said predetermined operation selected by said selecting means while said user's gazing position corresponds to said display portion.

* * * * *

UNITED STATES PATENT AND TRADEMARK OFFICE
CERTIFICATE OF CORRECTION

PATENT NO. : 5,581,323

DATED : December 3, 1996

INVENTOR(S) : ETSURO SUZUKI, ET AL.

It is certified that error appears in the above-indentified patent and that said Letters Patent is hereby corrected as shown below:

COLUMN 3

Line 53, "emitrance." should read --emittance.--

Line 57, "tripod's mounted on the camera," should read --camera is mounted on the tripod--.

COLUMN 4

Line 45, "(#207). (#203):" should read --(#207). ¶ (#203):--.

Line 49, "finder. (#204):" should read --finder. ¶ (#204):--.

COLUMN 2

Line 31, "of" should be deleted.

COLUMN 4

Line 56, "closed. (#206):" should read --closed. ¶ (#206):--

Line 57, "effected. (#207):" should read --effected. ¶ (#207):--.

UNITED STATES PATENT AND TRADEMARK OFFICE
CERTIFICATE OF CORRECTION

PATENT NO. : 5,581,323

DATED : December 3, 1996

INVENTOR(S) : ETSURO SUZUKI, ET AL.

It is certified that error appears in the above-indentified patent and that said Letters Patent is hereby corrected as shown below:

COLUMN 5

Line 10, "be" should read --is-- and "described. (#302):" should read --described. ¶ (#302):--.

Lint 36, "described. (#402):" should read --described. ¶ (#402):--.

COLUMN 7

Line 49, "where after" should read --whereafter--.

COLUMN 8

Line 19, "controling" should read --controlling--.

COLUMN 9

Line 59, "by" (second occurrence) should be deleted.

Signed and Sealed this

Twenty-ninth Day of April, 1997

Attest:

BRUCE LEHMAN

*Attesting Officer*       *Commissioner of Patents and Trademarks*